(12) United States Patent
Gore

(10) Patent No.: US 6,406,138 B1
(45) Date of Patent: Jun. 18, 2002

(54) POLYMER SYSTEMS FOR HIGH QUALITY INKJET PRINTING

(75) Inventor: Makarand P Gore, Corvallis, OR (US)

(73) Assignee: Hewlett-Packard Company, Palo Alto, CA (US)

(\*) Notice: Subject to any disclaimer, the term of this patent is extended or adjusted under 35 U.S.C. 154(b) by 0 days.

(21) Appl. No.: 09/556,033

(22) Filed: Apr. 20, 2000

(51) Int. Cl.$^7$ .................................................. B41J 2/17
(52) U.S. Cl. ............................ 347/96; 347/100; 347/95
(58) Field of Search .................... 347/96, 100, 103, 347/95; 106/31.13, 31.58

(56) References Cited

U.S. PATENT DOCUMENTS 6,238,045 B1 \* 5/2001 Ono et al. ..................... 347/96

FOREIGN PATENT DOCUMENTS

| JP | 05169789 | 12/1991 | ............ B41M/5/00 |
| JP | 08085250 | 9/1994 | ............ B41M/5/00 |
| JP | 08187870 | 1/1995 | ............ B41J/2/165 |
| JP | 09078012 | 9/1995 | ............ C09D/11/00 |
| JP | 09188063 | 1/1996 | ............ B41M/5/00 |
| JP | 09194776 | 1/1996 | ............ C09D/11/00 |
| JP | 09202866 | 1/1996 | ............ C09D/11/00 |
| JP | 10138628 | 11/1996 | ............ B41M/5/00 |

\* cited by examiner

Primary Examiner—John Barlow
Assistant Examiner—Manish S Shah

(57) ABSTRACT

An inkset suitable for inkjet printing is presented which contains a polymer system which reacts with chitosan to produce a gel precipitate on a substrate. The precipitant of this invention is created by the interaction of the chitosan in one fluid, such as an ink, and a reactive fluid in another pen, typically the $5^{th}$ pen. The gel form a protective film on the medium substrate and provides permanence benefits, such as increased drytime, smearfastness, smudgefastness, and waterfastness.

22 Claims, No Drawings

POLYMER SYSTEMS FOR HIGH QUALITY INKJET PRINTING

FIELD OF INVENTION

The present invention generally relates to a polymer system useful in inkjet printing systems comprising a multi-pen inkset. The precipitant gel layer of this invention is created by the interaction of two or more fluids. In one embodiment, an ink containing a chitosan salt contacts a reactive, or fixer, fluid containing a polymer to form a gel precipitant. The gel forms a protective film on the medium substrate and provides permanence benefits, such as increased drytime, smearfastness, smudgefastness, and waterfastness.

BACKGROUND OF THE INVENTION

The use of ink-jet printing systems has grown dramatically in recent years. This growth may be attributed to substantial improvements in print resolution and overall print quality, coupled with appreciable reduction in cost. Today's ink-jet printers offer acceptable print quality for many industrial, commercial, business and residential applications at costs fully an order of magnitude lower than comparable products available just a few years ago. Notwithstanding their recent success, intensive research and development efforts continue toward improving the permanence issues of ink-jet images.

Ink jet printing involves ejection of droplets of ink on a media to produce images. Typically these images are not resistant to image degrading factors, such as mechanical abrasion, light, water, and solvents, such as those used in highlighter pens. Advancing inkjet printing technology and consumer demand requires that printing systems become faster with quick drying times, minimum media distortion (i.e., paper cockle), improved permanence, and high chromatic efficiency.

A variety of approaches have been used to address some of these issues. For example, a 'fifth' pen or 'plain paper optimization' strategy has been used in inkjet products with some success. Other approaches include polymers formulated into inks followed by post treatment with heat or fusion, deposition of toner by electrography, and special additives such as lamellae or vesicle forming surfactants. A need, however, remains for improved products to meet the above needs and deliver consumer satisfaction with inkjet printing.

DETAILED DESCRIPTION OF THE INVENTION

It has been found that by use of a chitosan salt coupled with an aqueous based, polymer can produce the desired effects of improved drytime, smearfastness, waterfastness, improved color, permanence and cockle control. Without being limited by theory, it is believed the chitosan salt and polymers combine to form a gelatinous film upon interaction. Water and colorant are trapped in the film. The chitosan salt can be added to an ink composition or to a fixer fluid, generally known as a $5^{th}$ pen. The polymer should be added to another fluid in the inkset. Additionally, medium printed with the above ink and fixer can be further treated by hear or fusion (a combination of heat and pressure).

Definitions

Fluid—includes either or both the reactant fluid and ink compositions.

Reaction—means that the solubility or phase state of one or more components is changed as to immobilize the movement of at least one colorant on the print medium in the event that one fluid comes in contact with another fluid and interacts.

Reactant Fluid—also known as a $5^{th}$ or $6^{th}$ pen fluid or fixer fluid. A fluid that is typically substantially devoid of color (i.e., the reactant fluid may contain no colorant (e.g., dye or pigment), or it may contain a colorant that does not absorb visible light but may absorb in either or both the IR or UV spectrums). In one embodiment, the reactant fluid comprises a chitosan salt component that is reactive with a polymeric component in an ink, thus providing for enhanced image integrity of printed areas created with the ink, including, increased permanent (e.g. waterfastness, smearfastness, smudgefastness), improved color vibrancy, improved edge acuity, and reduced dry time. In the second embodiment, the chitosan salt is in the ink and the polymer in the $5^{th}$ pen fluid. The ink and fixer fluid are printed at least partially on a same pre-determined area on a print medium, or on pre-determined areas adjacent one another on a print medium. The reactive fluid is reactive with at least one ink formulated according to the present invention. A further $6^{th}$ pen clear fluid, which has additional protective properties, may be printed in addition to the color-containing fluids and the $5^{th}$ pen fluid. Typical fixer fluids without the chitosan-polymer additives of this invention are known in the art.

Ink—a fluid containing at least one colorant, the ink absorbing in one or more regions (e.g., visible, IR, UV, etc.). Ink-jet printers typically contain an ink set with black, magenta, cyan, and yellow inks, commonly known as a 4-pen ink set. Additional pens with additional color inks may also be present, such as a light magenta, a second black, or specialty graphic colors.

The present invention is directed to fluid sets, in particular for use in coloring applications, and more particularly for use in ink-jet printing. The present fluid set combines the benefits of interactive fluids while utilizing pigments or dyes providing enhanced image integrity to the ink-jet formula. The fluid set may be used in many applications of aqueous-based printing inks, in particular ink-jet inks for use in commercially available ink-jet printers such as DESKJET® printers, manufactured by Hewlett-Packard Company, of Delaware; and other commercially available home or office ink-jet printers.

Aqueous inks of this invention comprise, by weight, from about 0.5 to about 20 wt % colorant, preferably from about 1 to about 10%, and more preferably from about 1 to about 6 wt % colorant; from about 0.1 to about 40 wt % of one or more organic solvents. Additional ingredients are independently selected from the group consisting of surfactants, buffers, biocides, and mixtures thereof.

BEST MODES FOR CARRYING OUT THE INVENTION

It has been found that chitosan (polyglucosamines, such as found in exoskeleton matter like crab shells) of approximately 5,000 MW (wt average) in solution can be combined with certain polymers to form a gel layer on a substrate, such as plain paper. Examples of suitable salts of chitosan include: chitosan acetate, chitosan lactate, and chitosan succinate. By "chitosan" or "chitosan salts" as used herein, is also meant the broader class of reactive polymers based on chitosan, polysaccharides, and oxidized glucose, including polyglucosamines, polysaccharides modifed with cationic functionalities, and polysaccharides modified with carboxylate or other anionic functionalities, e.g., carboxy methyl chitosan. Other suitable charged polysaccharides included under the general term "chitosan", as used herein, include chondrotin sulfate, available from Vanson, Inc., Morristown, N.J. as Polychon™, carboxymethyl cellulose, hyaluronic acid-N-acetyl d-glucosamine and D-glucoronic acid polymer, alginats, alginic acid-1,4 linker polymer of D-mannonuronic acid (D-mannose is a saccharide), carrageenans (with a sulfate content of approximately 15%), and dextran sulfate. Suitable cationic polymers include diethyl aminoethyl cellulose (available as celquat H-100, L-200™ from National Starch Co.), dextran (DEZE™), cationic guars available from Celenese as Jaguars C-14s™, C-15™, and C-17™, Cationic starch, such as cato-72™, from National Starch, and cellulose/starch-dimethyldiallyl ammonium chloride copolymers, such as Floc-Aid 19™ from National Starch.

The chitosan salt, which may be employed alone or in any combination, are present in the ink or in the fixer fluid or fifth pen composition ranging from about 0.1 to 10 wt %. Less than about 5 wt % is preferred. More preferable the fluid contains from about 0.1 to about 1% by wt of chitosan salt. The reactive fluid, in addition to water and the chitosan salt described above, may also contain one or more of the same ingredients and in the same % amounts commonly formulated into inks. For instance, solvents, surfactants, amphiphiles, biocides, buffers may be present in the reactive fluids of this invention.

The inks of this invention are preferably pigment-based, although dye-based can be used, and contain either the chitosan salt or a set of one or more polymers matched to the chitosan salt. Examples of such polymers include, polyacrylic acid (MW of approximately 5,000), polystyrene-maleic anhydride derivatives, rosin, polyabiatic acid-maleic anhydride derivatives, polyamides such as GAX-12-513 from Henkel, and polyolefin-acrylates, and styrenated polyacrylates such as GAX-6000 from Henkel, and ABC triblock polymers, such at those in U.S. Pat. No. 5,519,085, wherein A block is a water soluble hydrophilic polymer, B block has functional groups, and C block is a polymer which is soluble in at least one water soluble organic solvent. Examples of ABC block polymers include methacrylic acid//phenylethyl methacrylate/dimethylaminoethyl methacrylate/ ethoxytriethylene glycol methacrylate (13//8/2//4); dimethylaminoethyl methacrylate/methyl methacrylate//phenylethyl methacrylate//ethoxytriethylene glycol methacrylate(7.5/5// 10//4); and methacrylic acid//phenylethyl methoacrylate// ethoxy-triethylene glycol methacrylate (13//10//4). The polymers, which may be employed alone or in any combination, are present in the ink ranging from about 0.1 to about 5 wt %. More preferable the ink contains from about 0.1 to about 1% by wt of polymer.

Colorants

Colorants for use herein may be dye-based and/or pigments based. As used herein, the term 'pigment' refers to a colorant that is insoluble in the aqueous vehicle, and includes disperse dyes as well as pigments that are either dispersed with the aid of a dispersant or those that are self-dispersed.

Examples of suitable colorants herein include organic dyes having at least one and preferably two or more carboxyl and/or carboxylate groups, examples of which are listed in U.S. Pat. No. 4,963,189 (filed by Hindagolla and assigned to the same assignee as the present invention, and incorporated herein by reference), and carboxylated pigments dispersions having a water insoluble colorant (e.g., pigment) dispersed with a dispersant preferably containing carboxylate solubilizing groups, such as those disclosed in U.S. Pat. Nos. 5,085,698, and 5,555,008, both incorporated herein by reference, or self-dispersed pigments provided under the Trade name Cabojet™ by Cabot Company.

Dyes suitable for use herein include any of the dyes commonly employed in the inkjet printing are, such as Food Black 2, Direct Red 227, Direct Blue 199, Direct Yellow 86. These dyes are commonly known as anionic dyes and contain one or more sulfonate ($SO_3$—) may also be used. As is well-known, these dyes are commonly associated with sodium cations.

Fluids

The fluids of the present invention, both the ink and the fixer fluid, may comprise from about 0.1 to about 40 wt % of at least one organic solvent. More preferably the fluids comprise from about 1 to about 25 wt % of at least one organic solvent with from about 5 to about 15 wt % being the more preferred. Optionally, one or more water-soluble surfactants/amphiphiles (0 to about 40 wt %, preferably about 0.1 to about 5 wt %) may be present. The inks of this invention have a pH in the range of from about 7 to about 11, preferably from about 8 to about 10, more preferably from about 8 to about 9. The $5^{th}$ pen fluids of this invention have a pH in the range of from about 2.5 to about 7, preferably from about 3 to about 6, more preferably from about 4 to about 5.

Aqueous Vehicle

All concentrations herein are expressed in weight percentages, unless otherwise indicated. The purity of all components is that employed in normal commercial practice for ink-jet inks. All cited documents and patents are hereby incorporated by reference.

Other ingredients added to the inks of this invention should be compatible with the above colorants employed in this invention. Likewise, other ingredients added to the reaction fluids of this invention should be compatible with the above reactive agents employed in this invention.

The aqueous vehicle is water or a mixture of water and at least one water-soluble organic solvent, as is well-known in the art. Selection of a suitable mixture depends on requirements of the specific application, such as the desired surface tension and viscosity, the selected colorant or reactive agent, drying time of the ink-jet fluid, and the type of print medium onto which the fluid will be printed. For a discussion of inks and their properties, see *The Printing Manual, $5^{th}$ Ed.*, Leach et al. (Chapman and Hall, 1993). See also U.S. Pat. Nos. 2,833,736; 3,607,813,; 4,104,061; 4,770,706; and 5,026, 755.

The water soluble organic solvents suitably employed in the present ink-jet ink compositions include any of, or a mixture of two or more, of such compounds as nitrogen-containing ketones, such as 2-pyrrolidinone, N-methyl-2-pyrrolidinone (NMP), 1,3-dimethylimidazolid-2-one, and octyl-pyrrolidinone; diols such as ethanediols (e.g., 1,2-ethanediol), propanediols (e.g., 1,2-propanediol, 1,3-propanediol), butanediols (e.g., 1,2-butanediol, 1,3-butanediol, 1,4-butanediol), pentanediols (e.g., 1,2-pentanediol, 1,5-pentanediol), hexanediols (e.g., 1,2-hexanediol, 1,6-hexandiol, 2,5-hexanediol), heptanediols (e.g., 1,2-heptanediol, 1,7-heptanediol), octanediols (e.g., 1,2-octanediol, 1,8-octanediol); triolos such as 2-ethyl-2-hydroxymethyl-1,3-propanediol and ethylhydroxypropanediol (EHPD); and glycol ethers and thioglycol ethers, commonly employed in ink-jet inks such as polyalkylene glycols such as polyethylene glycols (e.g., diethylene glycol (DEG), triethylene glycol, tetraethylene glycol), polypropylene glycols (e.g., dipropylene glycol, tripropylene glycol, tetrapropylene glycol, polymeric glycols (e.g., PEG 200, PEG 300, PEG 400, PPG 400) and thiodiglycol. Prefereably 2-pyrrlidinone, NMP, DEG, EHPD and 1,5-pentanediol are employed in the practice of this invention with 2-pyrrolidinone, DEG and 1,5-pentanediol being the most preferred solvents.

Suitable surfactants may be nonionic or anionic when used in the fluid vehicle. Examples of suitable nonionic surfactants include, secondary alcohol ethoxylates (e.g., Tergitol series available form Union Carbide Co.), nonionic fluoro surfactants (such as FC-170C available from 3M), nonionic fatty acid ethoxylate surfactants (e.g., Alkamul PSMO-20 available from Rhone-Poulenc), fatty amide ethoxylate surfactants (e.g., Aldamide L-203 available from Rhone-Poulenc), and acetylenic polyethylene oxide surfactants (e.g., Surfynol series, available from Air Products & Chemicals, Inc.). Examples of anionic surfactants include alkyldiphenyloxide surfactants (such as Calfax available from Pilot), and Dowfax (e.g., Dowfax 8390 available from Dow), and fluorinated surfactants (Fluorad series available form 3M). Cationic surfactants may be used in the reactive fluid which interacts with the ink vehicle and/or ink vehicle colorant. Cationic surfactants that may be used include betaines (e.g., Hartofol CB-45 available from Hart Product Corp., Mackam OCT-50 available form McIntyre Group Ltd., Amisoft series available from Ajinomoto), quaternary ammonium compounds (e.g., Glucquat series available from Amerchol, Bardac and Barquat series available from Lonza), cationic amine oxides (e.g., Rhodamox series available form Rhone-Poulenc, Barlox series available from Lonza) and imidazoline surfactants (e.g., Miramine series available from Rhone-Poulenc, Unamine series available from Lonza).

Buffers may be used to modulate pH and they can be organic based biological buffers or inorganic buffers such as sodium phosphate. Furthermore, the buffer employed should provide a pH ranging from about 4 to about 9 in the practice of the invention. Examples of preferably employed organic buffers include Trizma base, available from companies such as Aldrich Chemical (Milwaukee, Wis.), 4-morpholinoethanesulfonic acid (MES) and 4-morpholinopropanesulfonic acid (MOPS). The buffering agent concentration should not exceed about 0.5 wt % of the total ink composition due to crusting considerations. The buffering agent is typically used in the range of about 0.05 to 0.1 wt % of the total ink concentration, in order to reduce the possibility of crusting.

Any of the biocides commonly employed in ink-jet inks may be employed in the practice of the invention, such as NUOSEPT 95, available form Hals America (Piscataway, N.J.); Proxel GXL, available from Avecia (Wilmington, Del.); and glutaraldehyde, available from Union Carbide Company (Bound Brook, N.J.) under the trade designation UCARCIDEW 250. Proxel GXL is the preferred biocide. The biocide typically ranges from about 0.01 to 0.3 wt % of the total ink composition.

The balance of the ink compositions of the invention comprises water, specifically, deionized water.

Ink compositions within the foregoing listed ranges will print on a large variety of plain papers, such as xerography or photocopy paper, bond paper, and laser jet paper. The print quality achieved is high, and provides letter quality printing using a thermal ink-jet pen.

Printing Methods

This invention also encompasses a method for inkjet printing with the colorants and $5^{th}$ pen fluids discussed above.

The reactant fluids of this invention are preferably applied either or both under and over the ink layer in the printing process using methods known in the art for $5^{th}$ pen applications.

Ink containing one or more colorants is printed onto a substrate, such as paper, textile or transparency. Next, the ink is overprinted with a layer of $5^{th}$ pen fluid such that the ink comes into contact with the reactive agent in the reactive fluid.

Alternatively, the $5^{th}$ pen fluid may be underprinted as a first layer on the substrate and then the ink is overlaid on top of the $5^{th}$ pen fluid layer. And in another alternative, the $5^{th}$ pen fluid is both underprinted and overprinted with the ink layer.

The substrate after printing can be heated or fused by any means known in the art to increase the benefits of the chitosan-polymer reaction. Typical methods include thermal means such as a heated drum or fuser (heating to a temperature of from about 40 C. to about 400 C., preferably from about 100 C. to about 250 C.); photolytic means such as a light bar (exposure to light from about 200 nm to about 500 nm wavelengths, at a power of about 20–100 mJ/cm$^2$), or a laser (at wavelengths between about 200–600 nm, preferably from about 250–500 nm); or chemical treatment such as with suitable organic or inorganic acid or base.

EXAMPLES

The fixer fluids were prepared according to following formulations and use in printing.

|  | Fixer 2000K-2 | Fixer 2000M-2 | Fixer 2000P-2 |
| --- | --- | --- | --- |
| Chitosan Acetate | 0.5% | 0.5% | 0.5% |
| TEG | 0.0% | 0.0% | 6.0% |
| Glycerol | 0.0% | 15.0% | 0.0% |
| 1,5-Pentanediol | 2.0% | 0.0% | 10.0% |
| 2-Pyrrolidone | 10.0% | 0.0% | 4.0% |
| LEG1 | 4.0% | 0.0% | 0.0% |
| Multranol 4012 | 1.5% | 0.0% | 0.0% |
| Surfynol 465 | 0.0% | 0.0% | 0.5% |
| Zonylk FSN | 0.0% | 1.0% | 0.0% |
| Fluorad FC171 | 2.0% | 0.0% | 0.0% |
| Water | Remainder | Remainder | Remainder |

The inks were prepared using following formulations and used in printing experiments.

|  | Magenta | Cyan |
| --- | --- | --- |
| PB15:4 Colorant |  | 3.5 |
| PR122 Colorant | 3.5% |  |
| Polymer (60% Styrene, Maleic anhydride, reacted with 15% Jeffamine M1000, then hydrolyzed) | 4.5% | 4.5% |
| Liponic EG-1 |  |  |
| Tetraethylene glycol | 5.0 | 5.0 |
| 2-Pyrrolidinone | 4.0 | 4.0 |
| 1,5 Pentanediol | 5.0 | 5.0 |
| Aerosol OT | 0.80 | 0.80 |
| Zonyl FS62 | 0.2 | 0.2 |
| Proxel GXL | 0.25 | 0.25 |
| Remainder | water | water |

| Composition of Reactive Fluid Used for Comparison | |
| --- | --- |
| LEG-1 (Lipo Chemicals, Inc., Paterson, NJ) | 4 wt % |
| 1,5-pentanediol (Tricon Colors, Inc, Elmwood Park, NJ) | 2 wt % |

-continued

| Composition of Reactive Fluid Used for Comparison | |
|---|---|
| 2-pyrrolidone (Aldrich) | 10 wt % |
| Tergitol 15S7 (Union Carbide) | 2 wt % |
| Fluorad FC170C (3M) | 2 wt % |
| Polyethyleneimine, M = 2,000 (Aldrich) | 2.5 wt % |
| Succinic acid (Sigma) | 5 wt % |

The following data represents the improvement that can be obtained with systems of this invention in terms of waterfastness and smearfastness. Several different types of chitosan salts are used and improvements with various types of polymers are observed.

Smear improvement using Chitosan Fixers
  Summary of Smear Results, Cyan:
  pages fused at 180° C.
  data measured with CYAN filter in place on the Macbeth

|  | Fixer 2000K-2 | | Fixer 2000M-2 | | Fixer P-2 | | Polyamine Fixer | |
|---|---|---|---|---|---|---|---|---|
|  | GBND | CDCY | GBND | CDCY | GBND | CDCY | GBND | CDCY |
| Block | 0.84775 | 0.88775 | 0.99575 | 0.98175 | 0.949 | 1.11 | 1.055 | 1.1 |
| % Transfer | 3.32252 | 2.271661 | 7.088459 | 4.142263 | 6.234633 | 9.722222 | 13.00948 | 13.19697 |
| mOD | 28.16667 | 20.16667 | 70.58333 | 40.66667 | 59.16667 | 107.9167 | 137.25 | 145.1667 |

Summary of Smear Results, Magenta:
  pages fused at 180° C.
  data measured with NO filter in place on the Macbeth

|  | Maxer 2000K-2 | | Maxer 2000M-2 | | Maxer P-2 | | Polyamine Fixer | |
|---|---|---|---|---|---|---|---|---|
|  | GBND | CDCY | GBND | CDCY | GBND | CDCY | GBND | CDCY |
| Block | 0.6225 | 0.62525 | 0.66175 | 0.6515 | 0.64675 | 0.726 | 0.727667 | 0.74025 |
| % Transfer | 2.436412 | 1.546048 | 5.024556 | 2.545408 | 4.20049 | 10.42241 | 15.99863 | 15.82799 |
| mOD | 15.16667 | 9.666667 | 33.25 | 16.58333 | 27.16667 | 75.66667 | 116.4167 | 117.1667 |

Chroma improvements using Chitosan fixers is shown in the following table

| | Chroma of Color Inks with Fixer P-2 | | | | | |
|---|---|---|---|---|---|---|
| | CDCY | | | GBND | | |
| | L | C | h | L | C | h |
| C control | 60.70 | 43.98 | 254.01 | 61.81 | 43.89 | 255.85 |
| Y | 54.55 | 59.50 | 351.40 | 55.49 | 59.32 | 349.71 |
| M | 87.66 | 80.48 | 92.63 | 88.55 | 80.39 | 92.65 |
| R | 56.00 | 53.41 | 28.99 | 56.29 | 53.48 | 31.54 |
| G | 56.95 | 45.22 | 151.04 | 56.75 | 43.27 | 146.92 |
| B | 45.09 | 37.53 | 299.53 | 45.00 | 36.81 | 302.86 |
| C underprint | 56.87 | 49.84 | 252.72 | 56.86 | 51.44 | 253.04 |
| Y | 51.32 | 66.65 | 352.70 | 50.94 | 68.66 | 352.25 |
| M | 87.64 | 85.99 | 92.76 | 88.35 | 89.73 | 92.60 |
| R | 53.90 | 58.71 | 29.44 | 53.30 | 60.68 | 31.12 |
| G | 53.51 | 49.32 | 157.13 | 52.45 | 50.78 | 153.55 |
| B | 38.00 | 43.52 | 299.81 | 37.03 | 44.22 | 302.74 |

The values obtained in this data are the average taken of several readings using 'fixative' agents which include the specified chitosan salts.

What is claimed is:

1. A system for inkjet printing comprising:
    an inkset having at least two or more fluids wherein
        a) at least one of said fluids comprises a colorant;
        b) at least one of said fluids comprises a chitosan salt; and
        c) at least one of said fluids, other than a chitosan salt-containing fluid, comprises a polymeric agent which reacts with said chitosan salt upon contact, and
    a reaction enhancing device for enhancing the benefits of a reaction between the chitosan salt and the polymeric agent, wherein the reaction enhancing device is configured to provide additional energy to the reaction, said additional energy being at least one of a member selected from the group consisting of thermal energy, photolytic energy, and chemical energy.

2. A system according to claim 1 wherein said chitosan salt is selected from the group consisting of chitosan acetate, chitosan lactate, chitosan succinate, polyglucoamines, polysaccharides modified with cationic or anionic functionalities, and mixtures thereof.

3. A system according to claim 1 wherein said polymer is selected from the group consisting of polyacrylic acid, polystyrene-maleic anhydride derivatives, rosin, polyabiatic acid-maleic anhydride derivatives, polyamides, polyolefin-acrylates, styrenated polyacrylates, ABC triblock polymers, and mixtures thereof.

4. A system according to claim 1 comprising at least five fluids, wherein one of said five fluids is a clear fluid.

5. A system according to claim 4 wherein said clear fluid comprises a chitosan salt.

6. A system according to claim 5 wherein four of said five fluids comprise colorants selected from the group consisting of magenta, yellow, cyan, and black.

7. A system according to claim 6 wherein at least one of said colorant-containing fluids also comprise a polymer selected to react with chitosan salt to form a gel precipitate.

8. A system according to claim 4 wherein said clear fluid comprises a polymer selected to react with chitosan salt to form a gel precipitate.

9. A system according to claim 8 wherein four of said five fluids comprise colorants selected from the group consisting of magenta, yellow, cyan, and black.

10. A system according to claim 9 wherein at least one of said colorant-containing fluids also comprise a chitosan salt.

11. A method of inkjet printing comprising the steps of:
   a) printing a first fluid comprising a chitosan salt onto a substrate (Fluid A);
   b) printing a second fluid comprising a polymer reactant which reacts with said chiosan salt such that said second fluid contacts said first fluid (Fluid B); wherein at least one of sand fluids additionally comprises a colorant; and
   c) subjecting said first fluid and said second fluid to additional energy where the first fluid contacts the second fluid, said additional energy being at least one of a member selected from the group consisting of thermal energy, photolytic energy, and chemical energy.

12. A method according to claim 11 wherein the additional energy produces heat.

13. A method according to claim 11 wherein the additional energy results in fusion of the first fluid and the second fluid.

14. A method according to claim 11 wherein said chitosan salt is selected from the group consisting of chitosan acetate, chitosan lactate, chitosan succinate, polyglucoamines, polysaccharides modified with cationic or anionic functionalities, and mixtures thereof.

15. A method according to claim 11 wherein said polymer is selected from the group consisting of polyacrylic acid, polystyrene-maleic anhydride derivatives, rosin, polyabiatic acid-maleic anhydride derivatives, polyamides, polyolefin-acrylates, styrenated polyacrylates, ABC triblock polymers, and mixtures thereof.

16. A method according to claim 11 wherein said Fluid A is printed over Fluid B.

17. A method according to claim 11 wherein said Fluid A is printed under Fluid B.

18. A method according to claim 11 wherein said Fluid A is printed both over and under Fluid B.

19. A method according the claim 11 comprising an additional step of printing a third fluid, Fluid C.

20. A method according the claim 19 wherein Fluid C is clear.

21. A method according to claim 19 wherein said Fluid C is printed over Fluid A and Fluid B.

22. A method according to claim 19 wherein said Fluid C is printed under Fluid A and Fluid B.

* * * * *